Nov. 2, 1965          B. H. KRYZER          3,215,273
MULTIPLE FLOW VALVE CONTROL FOR LIQUID TREATMENT APPARATUS
Filed April 30, 1962          2 Sheets-Sheet 1
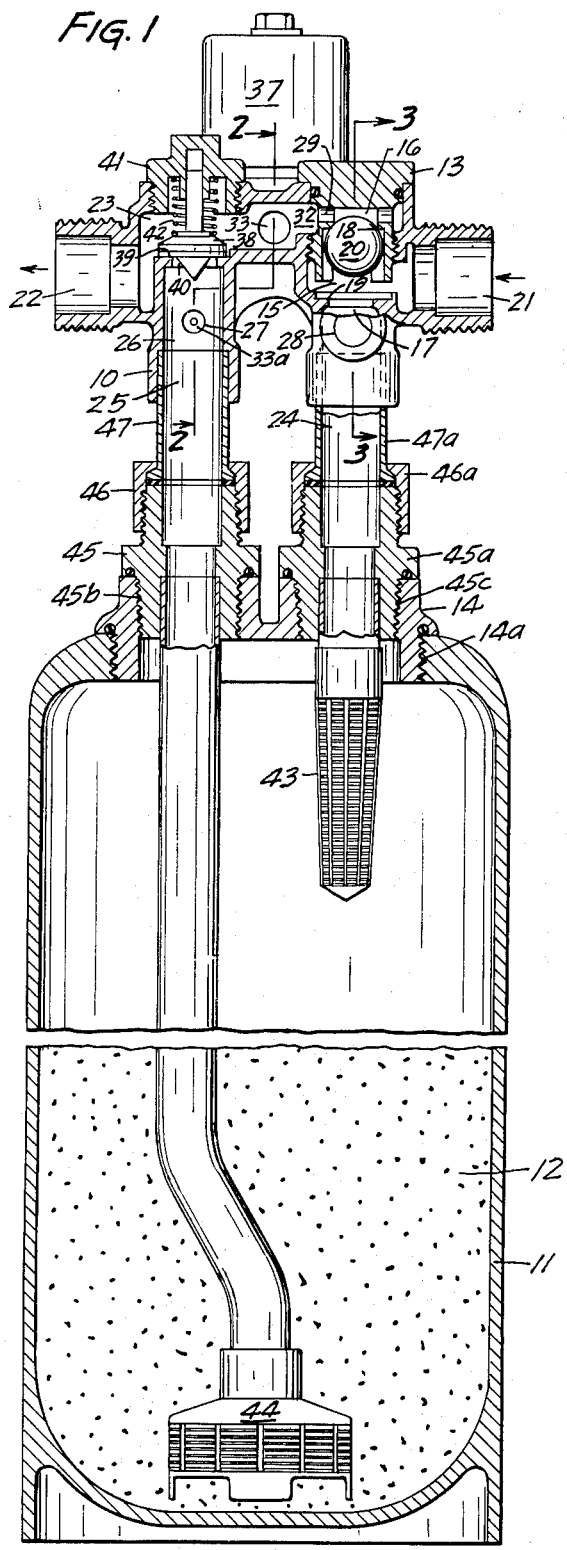
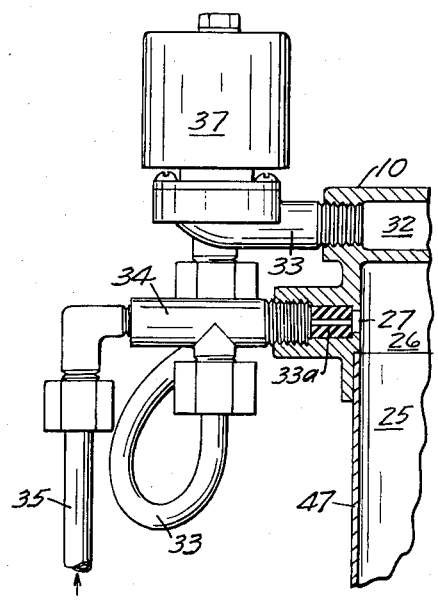
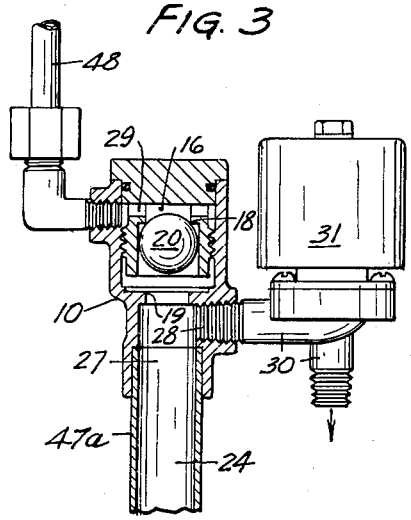
INVENTER
BENJAMIN H. KRYZER
BY
ATTORNEY Nov. 2, 1965

B. H. KRYZER 3,215,273

MULTIPLE FLOW VALVE CONTROL FOR LIQUID TREATMENT APPARATUS

Filed April 30, 1962

INVENTOR
BENJAMIN H. KRYZER
BY
John E. Stryker
ATTORNEY

United States Patent Office 3,215,273
Patented Nov. 2, 1965

3,215,273
MULTIPLE FLOW VALVE CONTROL FOR LIQUID
TREATMENT APPARATUS
Benjamin H. Kryzer, St. Paul, Minn., assignor to Union
Tank Car Company, Chicago, Ill., a corporation of
New Jersey
Filed Apr. 30, 1962, Ser. No. 190,995
11 Claims. (Cl. 210—121)

This invention relates to controls for water treatment apparatus and particularly to improved controls of the automatic or semi-automatic type which are adapted to institute and terminate a plurality of treatment operations of predetermined duration. The invention herein described is an improvement over that described in Patent No. 2,999,514, granted September 12, 1961.

It is an object of this invention to provide simplified controls of the class described including a multiple port two-way valve which is movable alternately to selected positions solely by fluid pressure differentials established in the several chambers by the operation of one or more auxiliary valves.

A further object is to provide flow controls of the character described which are particularly adapted for operation in connection with a regenerant supply system including a reservoir connected to ports of a main valve by a plurality of conduits one of which is provided for flow of the regenerant fluid from a regenerant reservoir to the main valve and another of which is for flow of fluid under pressure from the main valve to the regenerant reservoir.

A further and particular object is to provide a multiple flow valve of the character described wherein a multiple port two-way main valve has a closure member of spherical shape and of such specific gravity as to normally float to a predetermined elevated position closing a flow passage under normal static pressure conditions in the valve chambers.

Another object is to provide a flow control assembly of the class described having main valve components which are readily removable for service or replacement, individually.

My invention also includes certain other novel features of construction including a novel arrangement of flow passages and conduits whereby predetermined pressure differential conditions are reliably maintained in the several chambers of the control affecting the movement of a main valve closure member.

Referring to the accompanying drawings which illustrate by way of example and not for the purpose of limitation, a preferred embodiment of my improved multiple flow valve controls:

FIGURE 1 is a central vertical sectional view showing the main and auxiliary valve components and treatment tank;

FIG. 2 is a partial vertical sectional view taken on the line 2—2 of FIG. 1;

FIG. 3 is a vertical sectional view taken on the line 3—3 of FIG. 1, and

Figure 4:
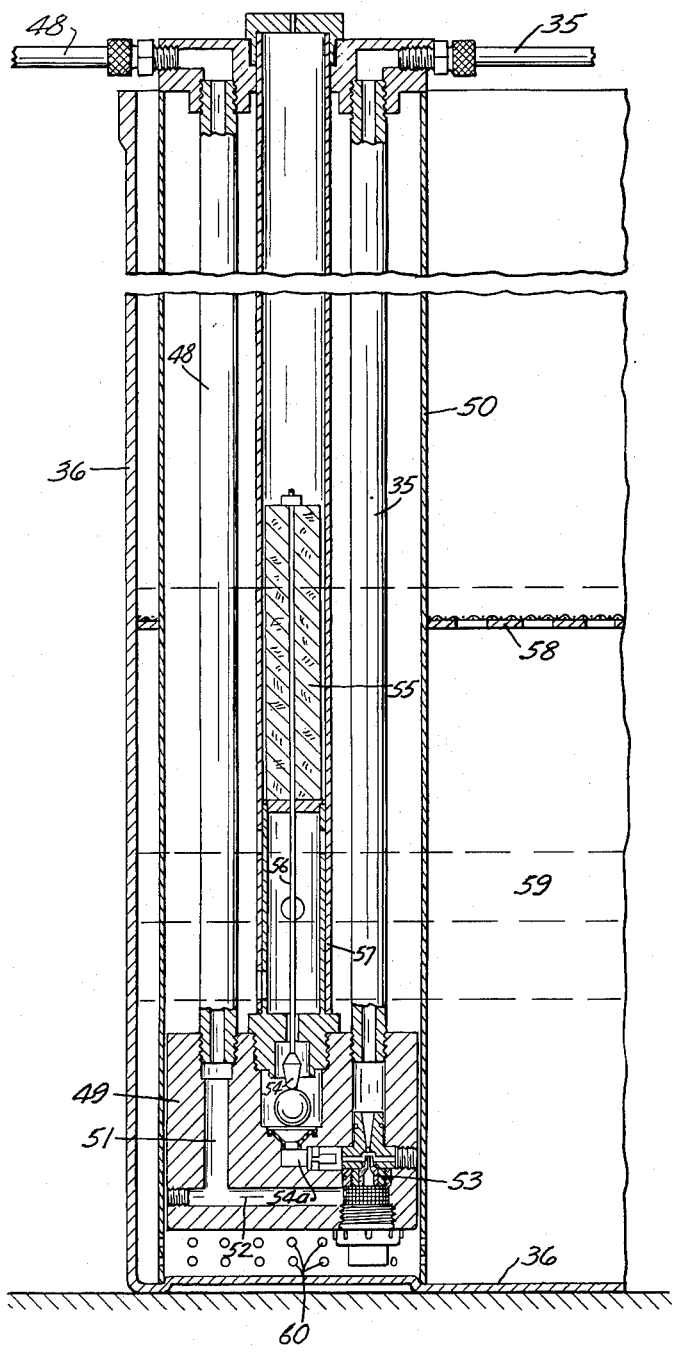
FIG. 4 is a central vertical sectional view showing regenerant supply components including a reservoir, float valve and injector components.

As shown in FIG. 1, my improved controls are contained in housing means including a housing member 10 which is connected by screw threaded fittings and conduits to the top of a liquid treatment tank 11 containing particulate material 12 through which the water or other liquid to be treated is passed. Treatment tanks containing particulate material of this general type have been used for many years for filters, water softeners and other treatment apparatus. The main valve components of my improved flow control are contained in the housing member 10. A second main valve housing member, indicated generally at 13, is an elongated tubular member which is removably secured in a cylindrical bore formed in the housing member 10. A series of chambers and ports communicating with the several chambers are formed in the members 10 and 13 and include a series of vertically aligned chambers comprising a middle chamber 15, an upper chamber 16 and a lower chamber 17. Oppositely disposed upper and lower valve seats, indicated at 18 and 19 respectively, are provided in the chamber 15 to alternately receive a closure member 20 which is preferably of spherical shape and of specific gravity or density less than 1. Closure member 20 may, for example, have a density within the range 0.9 to 0.99, so that when water fills the chamber 15, under static conditions, the closure member 20 floats to its elevated position, shown in full lines, wherein it is closed at the upper seat 18. The valve seats 18 and 19 surround circular ports or openings for flow from the chamber 15 alternately to the chamber 16 or 17.

A multiplicity of ports are formed in the housing member 10. These include an inlet port 21 in continuous communication with the chamber 15, an outlet port 22 in continuous communication with an outlet chamber 23, a first tank connecting port 24 at the lower end of the chamber 17, a second tank connecting port 25 at the lower end of a fourth chamber 26, a regenerant inlet port 27 also communicating with the chamber 26, a waste connecting port 28 communicating with the chamber 17 and a second outlet port 29 communicating with the chamber 16. A drain or waste conduit 30 (FIG. 3) is connected to the port 28 and a normally closed drain valve, indicated generally at 31 is interposed in the conduit 30 to control flow therethrough. Downstream from the valve 31 the conduit 30 is normally subject to substantially atmospheric pressure. Also formed in the housing member 10 is a by-pass passage 32 connecting the chamber 16 to the chamber 23 and including a conduit 33 branching from passage 32 to a T-fitting 34 communicating at one end with the regenerant inlet port 27.

A conduit 35 extends from the fitting 34 to a regenerant supply reservoir, indicated generally by the numeral 36. Interposed in the conduit 33 between the by-pass passage 32 and the fitting 34 is an auxiliary backwash valve indicated generally by the numeral 37 (FIG. 2). For fully automatic water treatment apparatus the auxiliary valves 31 and 37 are preferably of the normally closed electro-responsive type under control of a timer. The valves 31 and 37 may, for example, be of the solenoid or motor actuated type adapted to be electrically energized by means of circuits such as those described in the aforementioned Patent No. 2,999,514.

A check valve 38 is normally closed on a seat 39 surrounding a passage 40 connecting chamber 23 with chamber 26. The check valve 38 is guided for vertical movement in a screw cap 41 fitting in a threaded opening at the top of housing member 10. A light coiled spring 42 biases the valve 38 toward closed position on its seat 39.

Depending from and rigidly secured to the housing member 13 is a top tank distributor indicated generally at 43. A bottom tank distributor 44 is similarly connected to the lower end of a fitting 45 and the latter is joined by a union 46 and nipple 47 to the housing member 10 at its port 26. As further shown in FIG. 1, the distributor 43 is connected to the port 24 by members 45a, 46a and 47a, similar to the members 45, 46 and 47. An annular member 14 has a threaded connection 14a with the top of the tank 11 and is formed with threaded openings 45b and 45c to receive the fittings 45 and 45a respectively in laterally spaced relation one to the other. Each of the distributors 43 and 44 are formed with a multiplicity of narrow slots which exclude the particles of ion exchange resin or other material of the bed 12 from entering the flow passages leading to the tank connecting ports 24 and 25.

Regenerant supply means of the general type described in my co-pending application for patent, Serial No. 155,993, filed November 30, 1961, and now abandoned, may be operatively connected to my improved multiple flow valve control. Thus, as shown in FIG. 4, a conduit 48 may be extended from the second outlet port 29 to a regenerant metering valve 49 contained in a well 50. The lower portion of this well is submerged in regenerant liquid in the reservoir 36, and the lower end of the conduit 48 is connected to an inlet port 51 of the valve 49 from which a passage 52 extends to the inlet of an injector indicated generally at 53. Regenerant solution is supplied to the suction chamber of the injector 53 by a float valve indicated generally by the numeral 54. This valve is connected by a passage 54a to the suction chamber of the injector 53, and has a float 55 connected to a valve stem 56 which is guided for vertical movement in a tubular guide 57 in response to changes in the level of the liquid therein. The injector 53 is normally submerged in regenerant liquid in the well 50 and is arranged to discharge regenerant liquid upwardly into the lower end of the conduit 35 so that when the injector is in operation regenerant is withdrawn from the well 50 and forced through the conduit 35 into the regenerant inlet port 27 of the main control valve.

A supply of solid regenerant, e.g., common salt pellets, may be supported on a foraminous platform 58 through which regenerant solution passes into a chamber 59 surrounding the well 50. From the chamber 59 the liquid flows through openings 60 in the lower portion of the well 50 and rises in the well to an elevation corresponding to the liquid level in the reservoir 36.

The operation of my multi-flow control will be evident from the following description of an automatic water softener having a bed 12 of ion exchange resin through which the raw water to be softened is passed, and through which a regenerating solution is passed periodically. Raw water is supplied to the inlet port 21 under pressure, usually within the range 10 to 50 pounds per square inch. During the water softening cycle, closure member 20 is in its closed position on its upper seat 18 and raw water entering from the chamber 15 flows through the chamber 17, port 24, depending conduit members and distributor 43, into the upper portion of the treatment tank 11, thence downwardly through the bed 12 of treatment material, then into the distributor 44 and upwardly through the conduit 46, and other conduit members, chamber 26, past check valve 38 and out through port 22 to the service lines, being softened during its passage through the bed 12.

Also during the softening cycle, pressure slightly below the pressure in inlet chamber 15 is maintained in the chambers 16 and 23 and in by-pass passage 32 and conduits 35 and 48 which are in continuous communication one with the other through the aspirator 53. This difference in pressure between that in chamber 15 and that in chamber 23 is equal to the drop in pressure across the bed 12 due to the resistance to flow through the bed 12 and passages leading from chamber 15 to chamber 23 and pressure exerted by the check valve spring 42.

To initiate regeneration, the normally closed valve 31 is opened, thereby causing flow through the conduit 30 to the waste or drain outlet, and dropping the pressure in the treatment tank 11. Since the chambers 16 and 23 are under higher pressure after the opening of the valve 31 than that in the tank 11, the closure member 20 is forced downwardly off its seat 18 and is closed at its seat 19 by fluid pressure in the chambers 15 and 16.

When the closure member 20 is in open position in relation to its seat 18 raw water entering through the port 21 and chamber 15 is caused to flow through the port 29, conduit 48, passages 51 and 52 supplying the injector 53 with water under pressure. Brine is thereupon drawn through the valve 54 and passage 54a to the suction chamber of the injector, and is discharged upwardly into and through the conduit 35 so that the regenerant solution enters the main valve through the port 27. The regenerant liquid passes downwardly through the conduit 46, to the distributor 44 into the lower portion of the bed 12, and then flows upwardly through this bed to and through the distributor 43, port 24, chamber 17, port 28, drain valve 31, and drain outlet conduit 30. This flow of regenerant liquid may be followed by flush water and continues for a predetermined time or as long as the valve 31 remains open. A predetermined quantity of regenerant solution is thereby drawn from the reservoir chamber 59 under control of the float actuated valve 49.

For installations requiring backwashing of the bed 12, the backwash valve 37 may be actuated to open position while the drain valve 31 is still open. As shown in FIG. 2, a pressure responsive flow rate control device 33a is provided in the branch of the fitting 34 leading to the port 27. During backwash, the valve closure member 20 is retained in closed position on its lower seat 19 by pressure differential between the chambers 15 and 17 established, in part, by the flow restricting device 33a interposed between the backwash conduit 33 and port 27. Flow is thus established upwardly through the bed 12 from inlet port 21, through chambers 15 and 16, by-pass passage 32, conduit 33, valve 37, fitting 34, flow rate control device 33a, port 27, chamber 26, port 25, conduit 46, and distributor 44. From distributor 44 flow continues upwardly through the bed and then to waste through distributor 43, port 24, chamber 17, port 28, valve 31 and conduit 30. Also during backwash or when the valve 31 is still open, water pressure is fed to the regenerant reservoir valve 49 through both the conduits 35 and 48 so that the regenerant solution which has been used in the preceding regenerating cycle is replaced with water which refills the regenerant reservoir to a predetermined elevation above the platform 58 supporting the solid regenerant.

The apparatus may be returned to the water softening cycle by the closing of valves 31 and 37 automatically at a predetermined time. This restores line pressure in the treatment tank 11 and causes the closure member 20 to move from a closed position on its lower seat 19 to a closed position on its upper seat 18.

It will be evident that my improved multiple flow control eliminates the need for a regenerant injector as a component of a main valve structure associated with the liquid treatment apparatus. The control is greatly simplified by utilizing a closure member of the floating type, located in the middle chamber of a three-chamber, two-way multiple port main valve. This control embodies the further advantageous feature of being adapted to coact with remote regenerant supply means including an injector which is normally submerged in the regenerant liquid and adapted to be supplied with a measured quantity of regenerant liquid for each regenerating cycle.

Any suitable timer may be operatively connected to the electro-responsive auxiliary valves 31 and 37 to automatically initiate and terminate regeneration, backwash and softening cycles of predetermined duration.

I claim:

1. A multiple flow valve control for liquid treatment apparatus comprising, housing means defining a series of chambers including a middle chamber and upper and lower chambers, a fourth chamber, a first inlet port communicating with said middle chamber, a first outlet port, a first by-pass means connecting said upper chamber to said first outlet port, upper and lower ports connecting said upper and lower chambers respectively to said middle chamber, upper and lower oppositely disposed valve seats surrounding said upper and lower ports in said middle chamber, a float valve closure member freely movable in said middle chamber alternately to positions in closed relation to said upper and lower valve seats respectively, a tank connecting port communicating with said lower chamber, a second tank connecting port communicating with said fourth chamber, a regenerant supply connecting port communicating with said fourth chamber, a second by-pass means connecting said first by-pass means to said fourth chamber, a waste connecting port communicating with said lower chamber, a waste conduit connected to said waste connecting port, a second outlet port communicating with said upper chamber, said float valve closure member being free for movement between closed positions at its upper and lower seats in response to a predetermined fluid pressure differential between said upper and lower chambers, an outlet flow passage connecting said first outlet port to said fourth chamber, a valve interposed in said outlet flow passage and operable to prevent flow therethrough from said outlet port to said fourth chamber and to open to permit flow therethrough in the reverse direction, and independently operable valves interposed in said waste conduit and second by-pass means respectively.

2. A multiple flow valve control in accordance with claim 1 in which said liquid treatment apparatus includes regenerant supply means, a regenerant supply conduit connecting said regenerant supply means to said regenerant supply connecting port, and a liquid supply conduit connecting said regenerant supply means to said second outlet port.

3. A multiple flow valve control in accordance with claim 2 in which said regenerant supply means includes a regenerant reservoir and an injector disposed to receive regenerant from said reservoir and to discharge regenerant into said regenerant supply conduit under pressure of liquid supplied through said liquid supply conduit.

4. A multiple flow valve control in accordance with claim 1 in which said first valve closure member is of substantially spherical shape.

5. A multiple flow valve control in accordance with claim 1 in which said housing means comprise a main housing member and a separable housing member defining said upper and middle chambers, upper port and upper valve seat, said separable housing member being a vertically elongated tubular member having a threaded connection with said main housing member.

6. A multiple flow valve control in accordance with claim 1 in which said valve in said outlet flow passage is a check valve which is normally positioned to prevent flow through said outlet flow passage from said first outlet port to said fourth chamber.

7. A multiple flow valve control in accordance with claim 6 in which said check valve is carried by a threaded fitting in an opening in said main housing member.

8. A multiple flow valve control in accordance with claim 1, including electro-responsive means for actuating said independently operable valves to open said waste conduit and second by-pass means respectively, said valves being normally closed.

9. In a water softener, an improved multiple flow cycle changing control valve comprising, means defining a middle chamber and upper and lower chambers adjacent to said middle chamber, a remote fourth chamber, a hard water inlet port communicating with said middle chamber, a soft water outlet port, first by-pass means connecting said upper chamber to said soft water outlet port, ports in said middle chamber communicating with said upper and lower chambers respectively, upper and lower oppositely disposed valve seats surrounding said upper and lower ports, float valve means freely movable in said middle chamber alternately to positions closing said upper and lower valve seats respectively, a first softener tank connecting port communicating with said lower chamber, a second softener tank connecting port communicating with said fourth chamber, a regenerant supply connecting port communicating with said fourth chamber, second by-pass means connecting said first by-pass means to said fourth chamber, a waste connecting port communicating with said lower chamber, a waste conduit connected to said waste connecting port, an outlet flow passage connecting said soft water outlet port to said fourth chamber, check valve means interposed in said outlet flow passage to prevent flow therethrough from said outlet port to said fourth chamber and to permit flow therethrough in the reverse direction, waste valve means interposed in said waste conduit, and said float valve means being free for movement between closed positions at its upper and lower seats to thereby change cycles of said water softener in response to a predetermined fluid pressure differential between said upper and lower chambers caused by opening and closing said waste valve means.

10. In a water softener, an improved multiple flow cycle changing control valve comprising, means defining a middle chamber and upper and lower chambers, a fourth chamber, a hard water inlet port communicating with said middle chamber, a soft water outlet port, by-pass means connecting said upper chamber to said soft water outlet port, upper and lower ports connecting said upper and lower chambers respectively to said middle chamber, valve seats surrounding said upper and lower ports, float valve closure means movable in said middle chamber to positions closing said upper and lower valve seats respectively, a first softener tank connecting port communicating with said lower chamber, a second softener tank connecting port communicating with said fourth chamber, a regenerant supply port communicating with said fourth chamber, a waste port communicating with said lower chamber, a softener tank outlet flow passage connecting said soft water outlet port to said fourth chamber, second valve means interposed in said outlet flow passage operable to prevent flow through said outlet port to said fourth chamber and to permit flow in the reverse direction, waste valve means for opening and closing said waste port, and said float valve closure means being movable between closed positions at its upper and lower seats in response to a predetermined fluid pressure differential between said upper and lower chambers.

11. In a fully automatic water softener having a mineral tank with upper and lower distributors and a regenerating solution tank, an improved control valve for changing the cycles of said softener comprising, a middle chamber and upper and lower chambers, a fourth chamber, a hard water inlet port communicating with said middle chamber, a soft water outlet port, first by-pass means connecting said upper chamber to said soft water outlet port, upper and lower ports connecting said upper and lower chambers respectively to said middle chamber, upper and lower oppositely disposed valve seats surrounding said upper and lower ports in said middle chamber, a spherical float valve closure member freely movable in said middle chamber alternately to positions in closed relation to said upper and lower valve seats respectively, an upper distributor connecting port communicating with said lower chamber, a lower distributor connecting port communicating with said fourth chamber, a regenerating tank connecting port communicating with said fourth chamber, second by-pass means connecting said first by-pass means to said fourth chamber, a waste connecting port communicating with said lower chamber, a waste conduit connected to said waste connecting port, an outlet flow passage connecting said soft water outlet port to said fourth chamber, check valve means interposed in said outlet flow passage and operable to prevent flow through said outlet port to said fourth chamber and to permit flow in the reverse direction, independently operable valves interposed in said waste conduit and second by-pass means respectively, said spherical float valve closure member being free for movement between closed positions at its upper and lower seats in response to a predetermined fluid pressure differential between said upper and lower chambers, said first valve closure member closing said upper seat during the water softening cycle and closing said lower seat during the regeneration cycle.

References Cited by the Examiner
UNITED STATES PATENTS

| | | | |
|---|---|---|---|
| 2,715,098 | 8/55 | Whitlock | 210—191 X |
| 2,863,559 | 12/58 | Schulze | 210—191 X |
| 2,902,155 | 9/59 | Lundeen | 210—190 X |
| 2,999,514 | 9/61 | Kryzer | 210—191 X |
| 3,007,495 | 11/61 | Whitlock | 210—191 X |
| 3,049,237 | 8/62 | Whitlock et al. | 210—191 X |
| 3,083,728 | 4/63 | Schulze et al. | 210—191 X |
| 3,089,508 | 5/63 | Schulze et al. | 210—191 X |

REUBEN FRIEDMAN, *Primary Examiner.*

HERBERT L. MARTIN, *Examiner.*